A. L. SMITH.
Sled.

No. 67,142.

Patented July 23. 1867

Witnesses:
George Johnson
D. C. Willard

Inventor:
Abraham L. Smith

United States Patent Office.

ABRAHAM L. SMITH, OF MARENGO, MICHIGAN.

Letters Patent No. 67,142, dated July 23, 1867.

---

IMPROVEMENT IN COUPLING-REACHES FOR BOB-SLEIGHS.

---

The Schedule referred to in these Letters Patent and making part of the same.

---

TO ALL WHOM IT MAY CONCERN:

Be it known that I, ABRAHAM L. SMITH, of Marengo, in the county of Calhoun, and State of Michigan, have invented a new and improved "Swivel Extension Reach," for Bob-Sleds; and I do hereby declare that the following is a full, clear, and exact description of the construction and operation of the same, reference being had to the annexed drawings, making a part of this specification, in which—

Similar letters of reference indicate like parts in both figures.

A represents a forward, and B a hind bob-sled constructed in the usual manner, and coupled and connected by what I term my "extension swivel reach," and as it is only for the mode of combining and applying two well-known principles for special adaptation in coupling bob-sleds together that I claim any useful novelty, I not advert to said bobs, except in explanations necessarily connected with the subject-matter of my invention.

Figure 1:
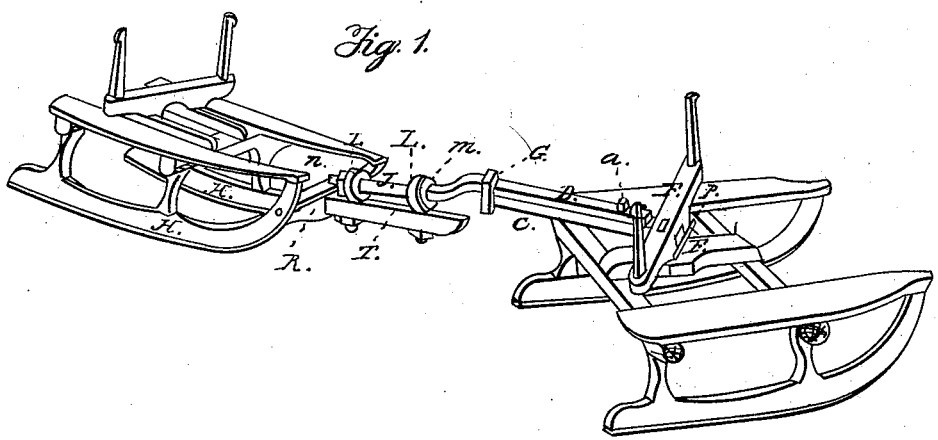
Figure 1 is a perspective view.
Figure 2:
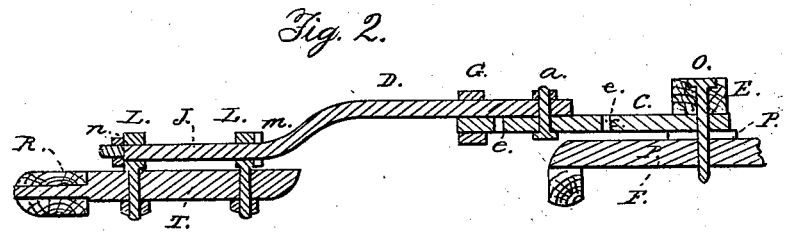
Figure 2 is a longitudinal section.

My improved reach is constructed usually of flat metal bars in two separate halves of unequal length. The shortest half, C, is straight, and connected at a right angle to and with the forward bolster E by inserting one end snugly in a mortise formed by cutting a gain of the width and depth of the bar, and covering the opening with an overlapping metal plate, p, which is secured to the under side of the bolster, and rests upon the sand-board F, or on a swivel plate attached thereto, the whole being secured together by the king-bolt o. The other end of the short reach C is provided with a rectangular guide-loop, G, to clasp and guide the longer extension-swivel portion D, which slides on top and may be connected to said short reach by the coupling-bolt and nut a, through any one of these series of holes e, so as to make the two combined a proper length for the load. I bend the journal or rounded portion of the bar J at the end connected with the roller-tongue T, so that said rounded portion, while being parallel with the extension end, will yet lie in a plane sufficiently lower to connect the journals of the roller R with the runners H at the right point of draught. The swivel journal J passes through loop bearings L, (secured to the roller-tongue,) against a collar, m, with which it is furnished, and is secured by an end nut n screwed tightly against a shoulder, so that said journal will turn freely in the loops aforesaid. Fig. 1 shows the hind bob as partially revolved on the swivel journal while passing over a side hill, the forward bob turning sharply to the left, and fig. 2 exhibits the reach lengthened or extended, as previously described.

It is equally common and useful to couple bob-sleds with a swivel, so that either one may be turned completely over without disturbing the other, consequently I claim no novelty of itself in coupling the journal end in loop bearings, nor do I consider the mere substitution of one material for another a patentable feature, and although the wooden reaches in wagons are made to couple long or short in a variety of ways, yet there are none with which I am acquainted that could be applied in connection with a swivel-bar coupling to fulfill all the requisite conditions for coupling bob-sleds, such as compactness to preserve proper clearance between the load and sand-board, resistance to side wrenches and torsional strain experienced in meandering with heavy loads over uneven ground while lumbering in the woods.

By the combined clasping and bolting of the two metal reach-bars I secure all the advantages of the "swivel reach," combined with facility of adjustment as to length and additional rigidity in those parts most liable to be sprung or fractured by the heavy service to which bob-sleds are subjected.

What I claim, and desire to secure by Letters Patent, is—

The arrangement and combination of the two metal reach-bars C and D with each other, and with a pair of bob-sleds, when such bars are constructed and connected substantially in the manner and for the purposes herein set forth.

ABRAHAM L. SMITH.

Witnesses:
GEORGE JOHNSON,
D. C. WILLARD.